No. 681,915. Patented Sept. 3, 1901.
J. H. HOFFMAN.
CHECK BOOK.
(Application filed May 15, 1901.)
(No Model.) 2 Sheets—Sheet 1.
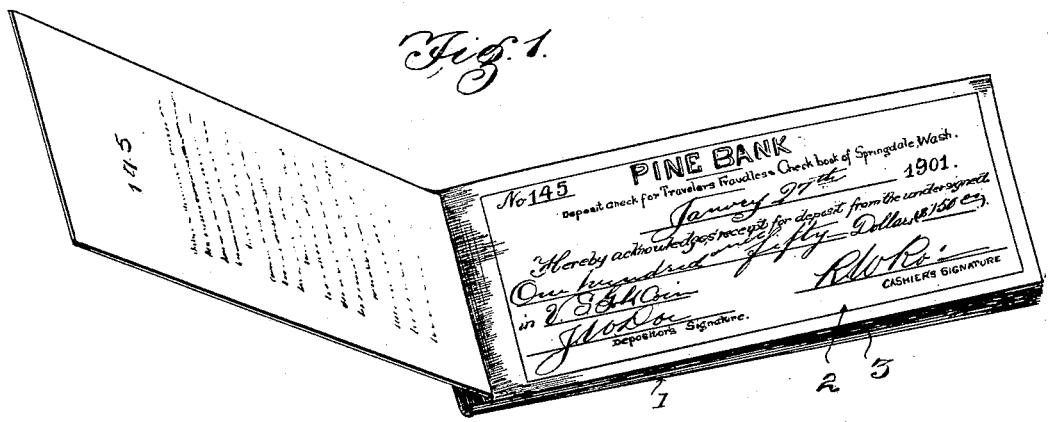
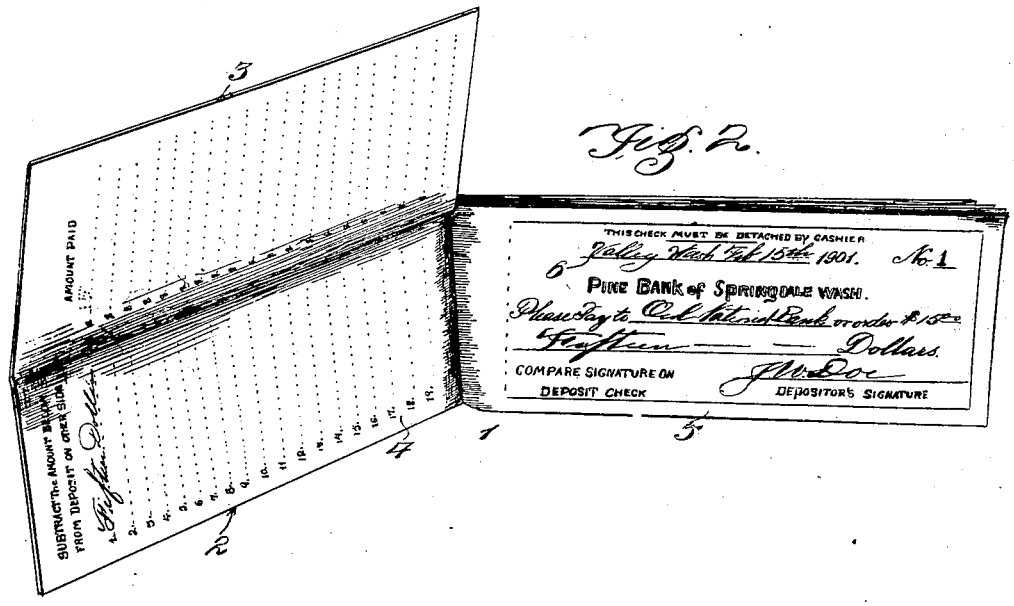

No. 681,915. Patented Sept. 3, 1901.
J. H. HOFFMAN.
CHECK BOOK.
(Application filed May 15, 1901.)
(No Model.) 2 Sheets—Sheet 2.
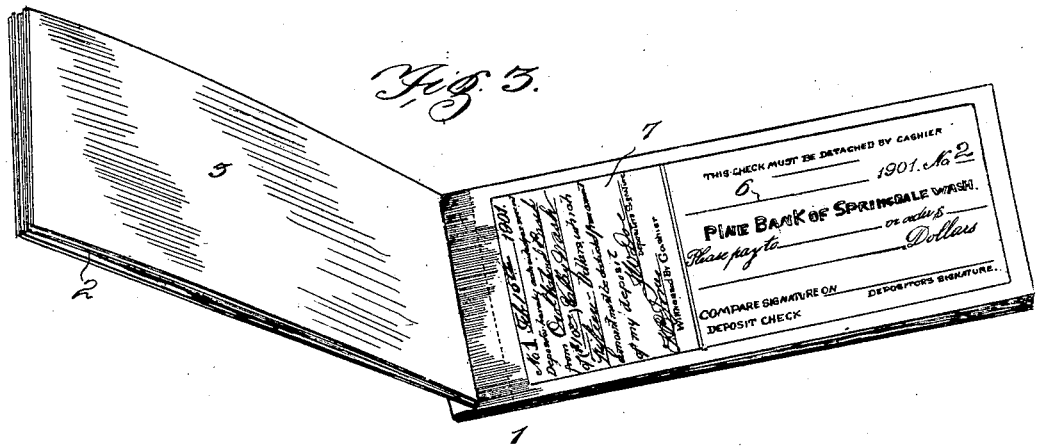
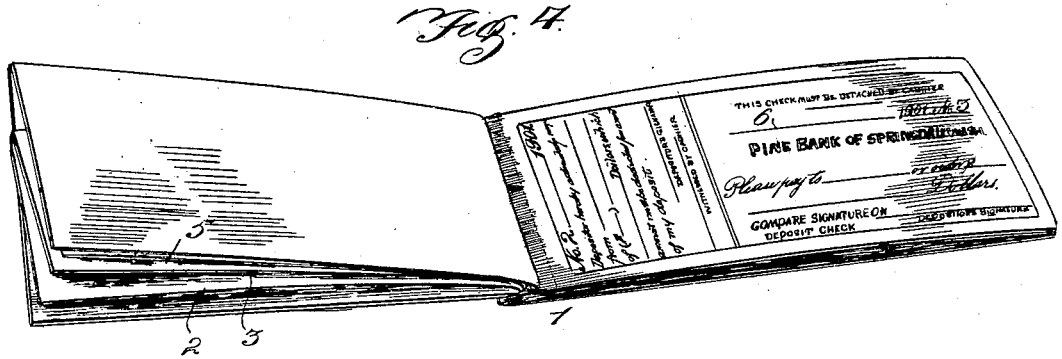

UNITED STATES PATENT OFFICE.

JAMES HOWARD HOFFMAN, OF SPRINGDALE, WASHINGTON, ASSIGNOR OF ONE-HALF TO ISRAEL MASTIN, OF SAME PLACE.

CHECK-BOOK.

SPECIFICATION forming part of Letters Patent No. 681,915, dated September 3, 1901.

Application filed May 15, 1901. Serial No. 60,361. (No model.)

*To all whom it may concern:*

Be it known that I, JAMES HOWARD HOFFMAN, a citizen of the United States, residing at Springdale, in the county of Stevens and State of Washington, have invented a new and useful Check-Book, of which the following is a specification.

This invention relates to check-books for use by travelers; and the object of the same is to provide a simple and effective device of this character which will guard against fraud and whereby a traveler may be enabled to deposit a certain amount of money in a bank at one location and have within the book a duly verified certificate as to the deposit of such amount and the signature of the depositor, the said certificate having means on the back for indicating the amounts drawn from bank where deposit is made or from banks in other localities and also provided with a folding member or leaf to indelibly receive the several amounts paid on the original deposit, the first check next to the certificate being without a stub and the succeeding checks each provided with a stub in the form of a depositor's receipt and numbered to correspond to the preceding check, so that the officials of the several banks may always know the balance remaining and if the checks drawn on their banks are worthy of honor. This same system can be carried on through express companies or other depository mediums and the traveler will thus be relieved of the responsibility of carrying large sums of money on his person and yet have means in his possession whereby he may readily obtain money when needed as long as the original deposit holds out and as represented by the certificate of deposit embodied in the improved book.

In the drawings, Figure 1 is a perspective view of a check-book embodying the features of the invention and showing the first leaf in the form of a certificate of deposit. Fig. 2 is a similar view of the book with the certificate turned over and the folding member thereof opened and also exposing the first check. Fig. 3 is a similar view showing the second check and the depositor's receipt for amount drawn by preceding check forming a part thereof. Fig. 4 is a view similar to Fig. 3 of the third check and depositor's receipt forming a part thereof unfilled.

Similar numerals of reference are employed to indicate corresponding parts in the several views.

The numeral 1 designates a check-book of ordinary dimensions and embodying a stiff back or cover. Instead of the usual first check-blank and its stub the present book embodies a certificate 2, having printed and written matter thereon verifying the deposit of a certain amount of money in a bank and completed by the signature of the cashier of such bank and the signature of the depositor, which is by this means identified as correct. The amount deposited is also cut through the said certificate by the usual method, and attached to the upper edge of the certificate is a leaf 3, which folds over the back thereof. On the back 4 of the certificate 2 are line-indications to receive the amounts successively drawn out by the use of the several checks from the original place of deposit or other banks and instructions to the effect that the amounts in total designated on the back of said certificate must be subtracted from the total amount of deposit stated by and indicated on the face of the said certificate to ascertain the balance standing to the credit of the depositor. On the adjacent face of the leaf 3 are a series of line-indications on which are indelibly cut or otherwise impressed the amounts of the several checks drawn, so as to avoid any destruction of the accurate record to be kept and overcome any liability of change of the numerals designating the several amounts that have been credited to the depositor on the original deposit, and thus satisfy the several bank officials or officers as to the reliability of the record presented to them. The first check 5 next to the certificate extends almost full length of the first check-leaf and, as shown, is made up in such manner that the bank named on the certificate of deposit is requested to pay to the order of another bank at a distance therefrom a certain amount, all of the checks being so drawn. Each check will also have a line 6 above the name of the bank in which the original deposit is made for writing or otherwise indicating thereon the name of the place at which the several checks are drawn and the date on which they are drawn. The second check, marked "No. 2," has as an integral part thereof, at the left end, the depositor's receipt 7, which is numbered the same as and acknowledges the receipt of the amount drawn by check "No. 1," the said receipt being signed by the depositor and holder of the check-book and witnessed by the cashier of the bank on which the said check was drawn. The amount drawn by check No. 1 is then stated on the back of the certificate and also indicated on the leaf 3, as before set forth. All the checks and receipts are thus successively filled out and the amounts drawn thereby registered on the back of the certificate and on the leaf 3 until all but one check in the book are used, and this being the last one is retained by the bank on which it is drawn, or if the amount of the deposit be exhausted before all the checks are used the bank on which the check is drawn covering the remaining balance retains the book and the original bank of deposit is notified. All entries on the back 4 of the certificate 2 as to the successive amounts drawn must be entered by the cashier or other proper official opposite the number corresponding to the check drawn and the successive checks presented to and held by the several banks on which they are drawn are returned, as usual, to the original bank of deposit and by the latter checked up, and upon receipt from the last bank holding the final check covering the balance of the deposit by the original depositing-bank the same course of return will be carried out if no errors appear. Book-number and depositor's check-number must always correspond and the depositor must always keep a record of his book-number, so if lost or stolen it can be referred to by number, and thereby be more readily identified.

This same mode of transaction for the benefit of travelers can be carried on by express companies and the like and will prove a great convenience to those traveling and desiring to be identified at different points in the course of their route for the purpose of obtaining money and also avoid the liability of losses by carrying large sums of money on the person.

The complete article will have printed instructions as to the use of the same and the governing rules to be followed on the inside surface of one or both of the covers.

Having thus described the invention, what is claimed as new is—

1. A check-book having a certificate of deposit with a foldable leaf and embodying means for identifying a depositor's signature, a verification as to amount deposited, a back-entry means for the several amounts drawn corresponding to the numbers of the checks and an auxiliary indelible entry of such amounts, and a series of checks, all except one of the latter having a depositor's receipt forming an integral part thereof and numbered to correspond to the preceding check.

2. A check-book having a certificate of deposit forming a part thereof and provided with means for directly receiving the amounts drawn by successive checks, and a series of checks, all except one of the latter having a depositor's receipt forming an integral part thereof and numbered to correspond to the check next preceding the same.

In testimony that I claim the foregoing as my own I have hereto affixed my signature in the presence of two witnesses.

JAMES HOWARD HOFFMAN.

Witnesses:
 M. KULZER,
 J. G. KULZER.